(12) United States Patent
Greenwood et al.

(10) Patent No.: US 10,040,361 B2
(45) Date of Patent: Aug. 7, 2018

(54) METHODS AND APPARATUS FOR INDICATING CHARGING STATUS OF A VEHICLE

(71) Applicant: Jaguar Land Rover Limited, Coventry (GB)

(72) Inventors: Jeremy Greenwood, Coventry (GB); David White, Coventry (GB); Chris Clarke, Coventry (GB); Richard Parkins, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 32 days.

(21) Appl. No.: 14/762,266

(22) PCT Filed: Jan. 24, 2014

(86) PCT No.: PCT/EP2014/051425
§ 371 (c)(1),
(2) Date: Jul. 21, 2015

(87) PCT Pub. No.: WO2014/114762
PCT Pub. Date: Jul. 31, 2014

(65) Prior Publication Data
US 2015/0360577 A1    Dec. 17, 2015

(30) Foreign Application Priority Data

Jan. 24, 2013 (GB) .................................. 1301240.6
Jan. 24, 2013 (GB) .................................. 1301243.0

(51) Int. Cl.
| | |
|---|---|
| *H02J 7/00* | (2006.01) |
| *B60L 11/18* | (2006.01) |
| *H02J 50/90* | (2016.01) |
| *H02J 50/10* | (2016.01) |

(Continued)

(52) U.S. Cl.
CPC .......... *B60L 11/1829* (2013.01); *B60L 1/003* (2013.01); *B60L 11/005* (2013.01); *B60L 11/182* (2013.01);
(Continued)

(58) Field of Classification Search
CPC ................................................... B60L 11/1829
(Continued)

(56) References Cited

U.S. PATENT DOCUMENTS 5,623,194 A    4/1997   Boll et al.
5,821,731 A *   10/1998   Kuki .................. B60L 11/1805
                                                                           320/108

(Continued)

FOREIGN PATENT DOCUMENTS

DE    10-2010-017759 A1    1/2012
DE    10-2011-006478 A1    10/2012
(Continued)

*Primary Examiner* — Richard V Muralidar
(74) *Attorney, Agent, or Firm* — Myers Bigel, P.A.

(57) ABSTRACT

The present invention relates to a motor vehicle (1) having an electric drive system including an electric traction motor (11) and an energy storage device (13). The vehicle (1) also has an adjustable-height suspension (7) to allow the height (h) of the vehicle (1) to be adjusted. A monitor (21) is provided for monitoring charging of the energy storage device (13) from an external electrical supply. A control unit (27) is provided for adjusting the height of the suspension (7) in dependence on the monitor (21). Aspects of the present invention also relate to a charging indicator system (3); and a method of indicating the charging status of a vehicle energy storage device (13).

19 Claims, 2 Drawing Sheets

(51) Int. Cl.
  *H02J 7/02* (2016.01)
  *B60L 1/00* (2006.01)
  *B60L 11/00* (2006.01)
(52) U.S. Cl.
  CPC ....... *B60L 11/1805* (2013.01); *B60L 11/1861* (2013.01); *H02J 7/0047* (2013.01); *H02J 7/025* (2013.01); *H02J 50/10* (2016.02); *H02J 50/90* (2016.02); *B60L 2240/545* (2013.01); *B60L 2240/547* (2013.01); *B60L 2240/549* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)
(58) Field of Classification Search
  USPC .......................................................... 320/108
  See application file for complete search history.

(56) References Cited

U.S. PATENT DOCUMENTS

| | | | |
|---|---|---|---|
| 6,421,600 | B1 | 7/2002 | Ross |
| 8,610,399 | B2 * | 12/2013 | Takada .................... H02J 5/005 |
| | | | 320/108 |
| 9,073,443 | B2 * | 7/2015 | Baier .................... B60L 11/182 |
| 2010/0159317 | A1 | 6/2010 | Taghikhani et al. |
| 2011/0220446 | A1 | 9/2011 | Hubner |
| 2012/0025761 | A1 * | 2/2012 | Takada .................... H02J 5/005 |
| | | | 320/108 |

FOREIGN PATENT DOCUMENTS

| | | |
|---|---|---|
| GB | 2 466 561 A | 6/2010 |
| GB | 2 468 560 A | 9/2010 |
| JP | 2011-250531 A | 12/2011 |
| WO | WO 2012/079668 A2 | 6/2012 |

* cited by examiner

METHODS AND APPARATUS FOR INDICATING CHARGING STATUS OF A VEHICLE

RELATED APPLICATIONS

This application is a 35 U.S.C. § 371 national stage application of PCT Application No. PCT/EP2014/051425, filed on Jan. 24, 2014, which claims priority from Great Britain Patent Application Nos. 1301243.0 and 1301240.6, both filed on Jan. 24, 2013, the contents of which are incorporated herein by reference in their entireties. The above-referenced PCT International Application was published in the English language as International Publication No. WO 2014/114762 A2 on Jul. 31, 2014.

TECHNICAL FIELD

The present invention relates to a charging indicator for a vehicle and particularly, but not exclusively, to a vehicle configured to provide a visual indication of the charging status of an energy storage device. Aspects of the invention relate to a vehicle, to a charging indicator system and to a method of indicating the charging status of a vehicle energy storage device.

BACKGROUND

Motor vehicles having one or more electric drive motors are becoming increasingly common. By way of example, these vehicles can be Electric Vehicles (EV), Hybrid Electric Vehicles (HEV), Plug-in Hybrid Vehicles (PHV) etc. A chemical battery comprising a plurality of cells is commonly provided as an energy source for the electric drive motor(s). The battery can be charged by regenerating energy while the vehicle is travelling, for example using regenerative braking techniques. Alternatively, the battery can be charged by connection to a mains electrical system, either by a wired connection or an induction (wireless) connection. A dashboard display may notify the driver that charging is taking place. However, when the user is outside the vehicle, the user is provided with little or no indication that charging is taking place. In the case of a wired connection, the user may need to check that the mains source is switched on. This can be more problematic in the case of an induction connection as there is no physical connection between the charging station and the vehicle. If, for example, the vehicle is not correctly aligned with the charging station, the rate at which the vehicle is charged may be reduced.

It is against this background that the present invention has been conceived. At least certain embodiments of the present invention set out to overcome or ameliorate at least some of the shortcomings of prior art systems.

SUMMARY OF THE INVENTION

Aspects of the present invention provide a vehicle configured to provide a visual indication of the charging status of an energy storage device; a charging indicator system; and a method of indicating the charging status of a vehicle energy storage device.

According to a further aspect of the present invention, there is provided a motor vehicle comprising:
an electric drive system including at least one electric traction motor and an energy storage device;
an adjustable-height suspension;
means for monitoring charging of the energy storage device from an external electrical supply; and
control means for controlling the height of said suspension in dependence on the monitoring means. Adjusting the height of the suspension causes a corresponding change in the height of the vehicle. By varying the height of the vehicle based on the monitoring means, a user is provided with a visual indication of the charging status of the energy storage device. For example, the control means can be configured to raise or lower the suspension height when the monitoring means determines that the energy storage device is being charged. The user can thereby determine the charging status without the need to look into the vehicle cabin or check whether the external electrical supply is connected.

The energy storage device is configured to supply electrical current to the at least one electric traction motor. The energy storage device can, for example, be a chemical battery or a capacitor (typically a so-called supercapacitor).

The motor vehicle can comprise an induction coil for coupling to a charging station connected to the external electrical supply to perform inductive charging of the energy storage device. The induction coil can couple wirelessly to a base induction coil provided in a charging station. In use, the base induction coil generates a varying electromagnetic field which induces a charging current in the induction coil disposed in the vehicle. The external electrical supply does not form part of the vehicle. The external electrical supply can, for example, comprise one or more of the following: a mains electrical supply; a standalone/portable electrical supply; and an off-grid electrical supply (for example charged by solar or wind energy).

The control means can be configured to control the vehicle suspension to adjust the height of the suspension when the monitoring means detects a charging current in the induction coil. The control means can be configured to control the height of said suspension to optimise the charging efficiency of said induction coil. The control means can reduce the height of the suspension when the monitoring means determines that the energy storage device is being charged, for example by detecting a charging current in the induction coil. The induction coil is typically provided on an underside of the vehicle for coupling to a base induction coil provided at ground level. Lowering the vehicle suspension can reduce the gap between the induction coil disposed in the vehicle and the base induction coil and it is believed that this will improve the efficiency of the transfer of energy from the charging station to the vehicle. The control means can be configured to adjust the height of the suspension to a pre-defined optimum height; or can be configured to determine the optimum height dynamically based on system feedback, such as the charging current detected in the induction coil.

The control means can be configured to raise the suspension when charging of the energy storage device is complete. The control means can be configured to raise the suspension to a predefined setting, for example corresponding to the height before charging was initiated.

The control means could optionally be configured to adjust the height of the suspension based on charging status. For example, the monitoring means could estimate a State of Charge (SOC) of a battery based on the cell voltage and temperature. The suspension height could be adjusted in proportion to the estimated SOC of the battery. For example, the suspension could be raised as the estimated SOC increases.

The suspension can be an air suspension and the height of the suspension can be adjusted by controlling the pressure of air within the suspension. The suspension can be coupled to a fluid reservoir which is in communication with a compressor for supplying pressurized air. The control means can be configured to control operation of the compressor for re-charging the fuel reservoir; and/or one or more control valves for supplying pressurized air from the fluid reservoir to the suspension. The control means can also be configured to control one or more release valves for releasing air from the suspension. The control valve(s) and the release valve(s) could be combined, for example comprising one or more three-way valves.

The control means can be configured to operate the compressor to re-charge the fluid reservoir while the energy storage device is being charged. By operating the compressor whilst charging is on-going, the power in the on-board energy storage device can be conserved. The control means can be configured to terminate charging of the energy storage device after the fluid reservoir has been re-charged. The control means can, for example, transmit a terminate signal to the charging station to end a charging cycle.

In an alternative arrangement, a mechanical actuator can be provided for adjusting the height of the suspension. For example, a lead screw can be provided to adjust the suspension height mechanically. The lead screw can be connected to an electric motor controlled by said control means. The control means can be configured to control operation of the electric motor to adjust the suspension height while the energy storage device is being charged.

The vehicle can comprise at least one light source operatively controlled by the control means to provide a visual indication that the energy storage device is charging. The light source can be an internal light source, for example disposed in the vehicle cabin; or an external light source, for example disposed under the vehicle. The control means can be configured to control the at least one light source in dependence on said monitoring means. The control means can be configured, in dependence on the monitoring means, to activate/deactivate said at least one light source; and/or control the intensity of said at least one light source; and/or control the colour of the light emitted by said at least one light source. This can provide an additional visual indication that the vehicle is being charged.

Alternatively, or in addition, the vehicle may comprise a vehicle accessory controlled by the control means to provide a visual indication that the energy storage device is charging and optionally a state of charge of the energy storage device. The control means can be configured to control a position of said vehicle accessory with respect to said vehicle in dependence on said monitoring means. The vehicle accessory may comprise at least one of an external mirror and a windscreen wiper, and control means may be configured to control an orientation of said vehicle accessory with respect to the vehicle in dependence on said monitoring means. This can provide an additional visual indication that the vehicle is being charged and optionally of a state of charge of the energy storage device.

According to a still further aspect of the present invention there is provided a vehicle charging system for a motor vehicle having at least one electric traction motor and an energy storage device; the vehicle charging system comprising:
   means for monitoring charging of the energy storage device; and
   control means for controlling an adjustable-height suspension in dependence on the monitoring means.

According to a yet further aspect of the present invention there is provided a method of indicating the charging status of a vehicle energy storage device, the method comprising:
   monitoring a charging status of the vehicle energy storage device; and
   adjusting a height of a suspension system to vary the vehicle height in dependence on the charging monitor.

The method can include lowering the height of the suspension system during charging of the vehicle energy storage device. The method can include increasing the height of the suspension system when charging of the vehicle energy storage device is complete.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

An embodiment of the present invention will now be described, by way of example only, with reference to the accompanying Figures, in which.

DETAILED DESCRIPTION OF AN EMBODIMENT

Figure 1:
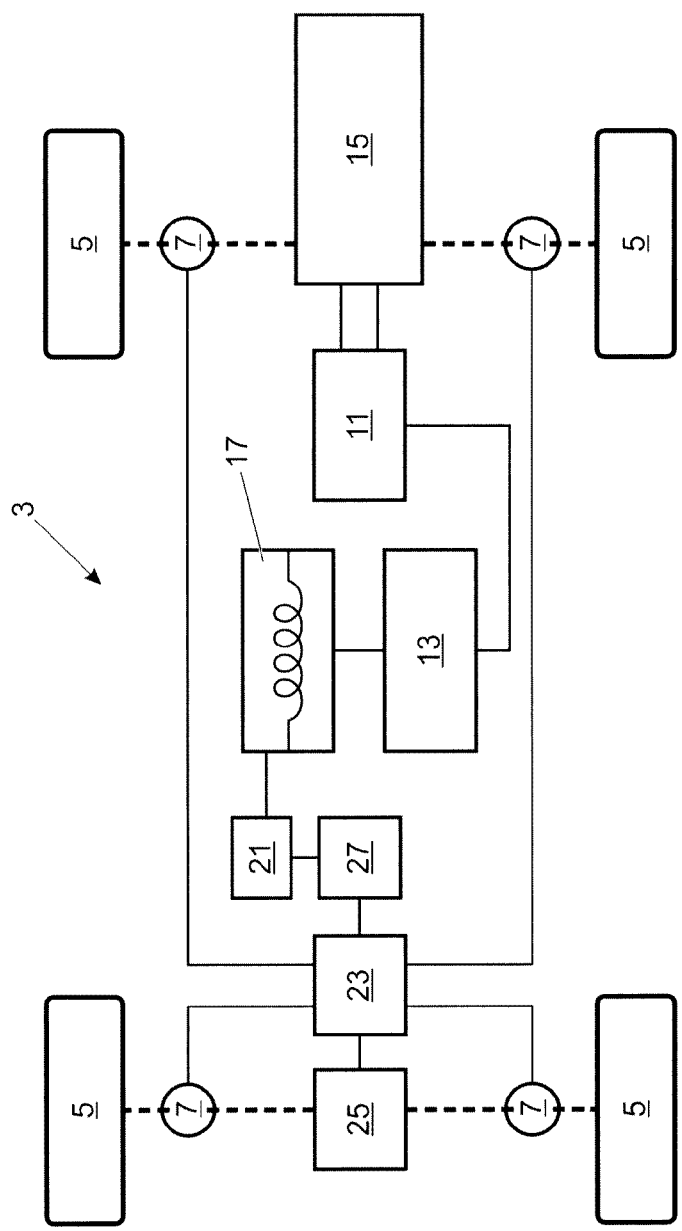
FIG. 1 shows a schematic plan view of a vehicle incorporating the charging indicator system in accordance with a first embodiment of the present invention.
Figure 2:
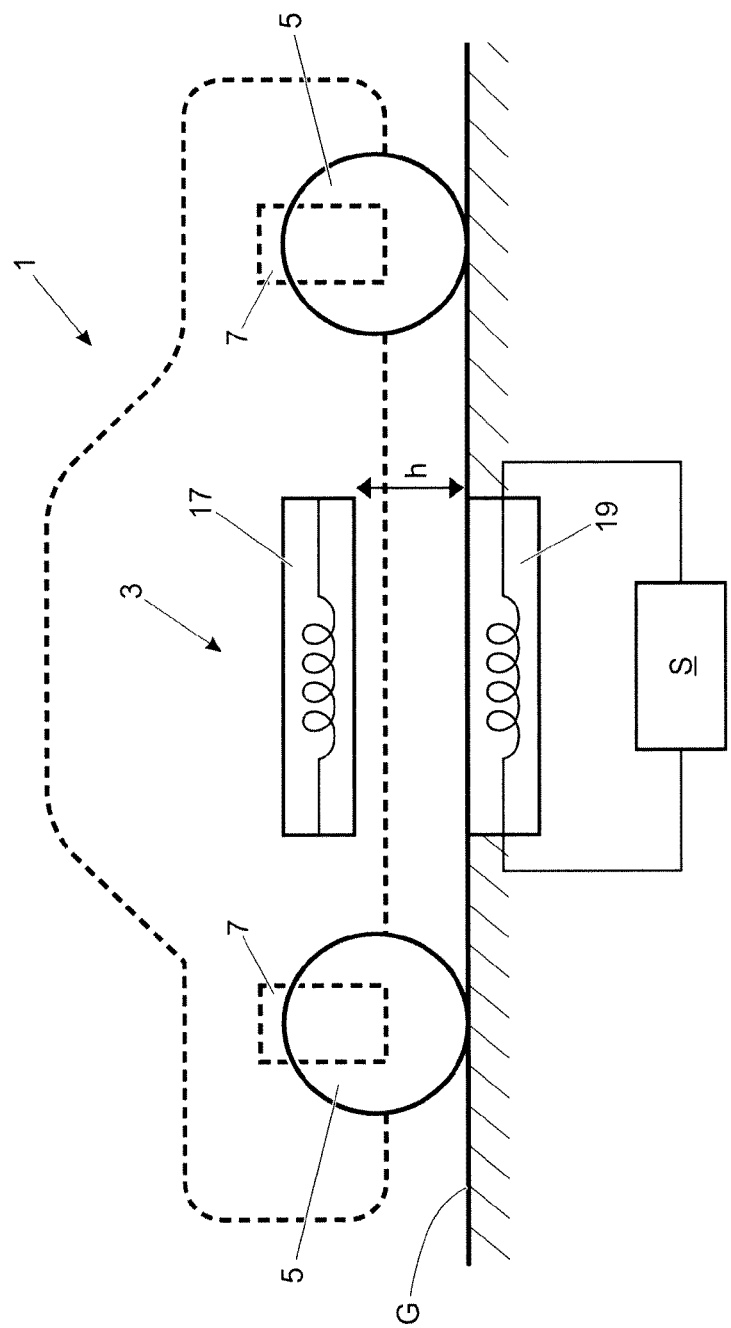
FIG. 2 shows a schematic side elevation of the vehicle shown in FIG. 1.

A motor vehicle 1 having a charging indicator system 3 in accordance with an embodiment of the present invention will now be described with reference to FIGS. 1 and 2. The vehicle 1 has four wheels 5 and an adjustable-height suspension 7. The suspension 7 is operable to adjust the ride height 'h' of the vehicle 1 relative to the ground G, as shown in FIG. 2.

The motor vehicle 1 has a drivetrain including an electric traction motor 11 and a battery 13. The motor vehicle 1 in the present embodiment is a hybrid electric vehicle (HEV) also having an internal combustion engine 15, but the invention could equally be embodied in an electric vehicle (EV). The battery is a chemical battery (i.e. a battery which converts chemical energy into electrical energy) comprising a plurality of cells, for example lithium ion (Li+) cells, arranged in series and parallel. The State of Charge (SOC) of the battery can be estimated based on the temperature and voltage of the cells. It will be appreciated that the motor vehicle 1 can comprise more than one electric traction motor 11. The battery 13 is a traction battery 13 for powering the electric traction motor(s) 11. The battery 13 could be another energy storage device, such as a supercapacitor.

The vehicle 1 has a first induction coil 17 for wirelessly coupling with a second induction coil 19 provided in a charging station S. The first induction coil 17 is disposed underneath the vehicle and the second induction coil 19 is typically floor-mounted, as illustrated in FIG. 2. A time varying current is supplied to the second induction coil 19 to establish a time varying electromagnetic field which induces a charging current within the first induction coil 17 to charge the battery 13. The time varying current supplied to the second induction coil 13 can, for example, be a variable current, an alternating current or a pulsating current. In use, the vehicle 1 is parked at least substantially to align the first and second induction coils 17, 19 to enable inductive (wireless) charging. The vehicle 1 optionally also has a physical connector (not shown), such as a plug/socket, to enable wired charging.

The charging indicator system 3 comprises means for monitoring the charging status of the battery 13 (via inductive charging and optionally also by wired charging). The monitoring means in the present embodiment is in the form of a charging monitor 21 configured to monitor when the vehicle is charging and when the charging has been completed. The charging monitor is configured to estimate the SOC of the battery 13 based on cell voltage and temperature. The charging monitor 21 can also monitor a charging current when the first induction coil is energized.

As outlined above, the suspension 7 is operable to adjust the height h of the vehicle 1 relative to the ground G. The suspension 7 in the present embodiment is an air suspension in fluid communication with a fluid reservoir 23. A compressor 25 is coupled to the fluid reservoir 23 to supply pressurized air to the fluid reservoir 23. A control valve (not shown) is provided for selectively controlling the supply of pressurized air from the fluid reservoir to the suspension to raise the vehicle height. Similarly, a release valve (not shown) is provided for selectively releasing air from the suspension to lower the vehicle height. By controlling the pressure of air in the suspension 7, the height h of the vehicle 1 relative to the ground G can be controlled.

The charging indicator system 3 according to the present embodiment comprises means in the form of a control unit 27 for controlling the adjustable-height suspension 7 in dependence on the charging status of the battery 13, as determined by the charging monitor 21. Specifically, the charging monitor 21 outputs a charge status signal to the control unit 27 based on the estimated SOC of the battery 13.

The control unit 27 is configured to actuate the release valve to reduce the pressure in the fluid reservoir 23 when the charging monitor 21 determines that the battery 13 is being charged. The reduction in fluid pressure lowers the suspension 7 and reduces the vehicle height h. This arrangement is advantageous as it provides a visual indication that the vehicle battery 13 is being charged. Moreover, lowering the vehicle 1 brings the first and second induction coils 17, 19 closer together and this can improve charging efficiency. The control unit 27 can be configured to control the suspension 7 to set the vehicle height h to optimise charging efficiency.

When the charging monitor 21 determines that charging of the battery 13 is complete or nearly complete, the control unit 27 actuates the control valve to supply pressurized air from the fluid reservoir 23 to the suspension 7 to raise the vehicle height h. The vehicle height h is increased to a pre-set level, typically corresponding to the vehicle height h before charging was initiated. The increase in vehicle height h provides a visual indication that the charging of the battery 13 is complete.

Once the vehicle height h has been increased, the control unit 27 operates the compressor 25 to re-charge the fluid reservoir 23. The control unit 27 is configured to operate the compressor 25 while the first and second induction coils 17, 19 are coupled to each other, thereby reducing the power consumption from the vehicle battery 13 to operate the compressor 25. The control unit 27 terminates charging once it determines that the charging is complete and the vehicle 1 has been returned to the pre-set level. The control unit 27 may, for example, transmit a charging complete signal to the charging station S.

The operation of the charging indicator system 3 will now be described. When the battery 13 is not being charged, the charging indicator system 3 is dormant. The user then parks the vehicle 1 in proximity to the charging station S such that the first induction coil 17 is positioned above the second induction coil 19. The charging station S is then activated, either manually or automatically, and the second induction coil 19 generates a time varying electromagnetic field which induces a charging current in the first induction coil 17. When the charging monitor 21 detects the charging current, the control unit 27 is awakened. The charging monitor 21 outputs a control signal to the control unit 27 to indicate when the battery 13 is being charged. In dependence on the control signal from the charging monitor 21, the control unit 27 operates said release valve to release air from the vehicle suspension 7 to lower the vehicle height h.

When the charging monitor 21 determines that charging of the battery 13 is complete or nearly complete, the control unit 27 operates said control valve to supply pressurized air from the fluid reservoir 23 to the suspension 7. The vehicle height h is thereby increased. Once the vehicle 1 has returned to its pre-set height, the control unit 27 activates the compressor 25 to re-charge the fluid reservoir 23.

The charging unit 21 outputs a charging complete signal to the control unit 27 when it determines that the battery is fully charged. The control unit 27 transmits a wireless signal to the charging station S to indicate that charging is complete. The control unit 27 could optionally also be configured to transmit a signal to a cellular telephone to notify the user that charging has been completed, for example in the form of a Short Messaging Service (SMS).

The vehicle height h could optionally be varied in dependence on the charge status signal from the charging monitor 21. For example, the height h of the vehicle could correspond directly to the estimated SOC of the battery 13. Alternatively, while the battery 13 is being charged, the vehicle 1 can be held at an optimum height h to improve charging efficiency. The control unit 27 can be configured to vary the optimum height h, for example in response to changes in the rate of charging.

An alternative to varying the vehicle height in dependence on the charging status might be to alter the position of a wing mirror to indicate the charging status. For example, the wing mirror could be retracted during charging and extended when charging is complete. The angular orientation of a windscreen wiper on the windscreen might also be used to indicate the charging status. The windscreen wiper could function as a gauge to represent charging status, for example to represent the estimated SOC of the battery 13.

It will be appreciated that various changes and modifications can be made to the embodiment of the present invention described herein without departing from the present invention.

Aspects of the present invention are set out in the following numbered paragraphs.

1. A motor vehicle comprising:
   an electric drive system including at least one electric traction motor and an energy storage device;
   an adjustable-height suspension
   a charging monitor for monitoring charging of the energy storage device from an external electrical supply; and
   a control unit for controlling the height of said suspension in dependence on the charging monitor;

wherein the control unit is configured to lower said suspension during charging of the energy storage device and to raise said suspension when charging of the energy storage device is complete.

2. A motor vehicle as described in paragraph 1, wherein the motor vehicle comprises an induction coil for coupling to a charging station connected to the external electrical supply.

3. A motor vehicle as described in paragraph 2, wherein the control unit is configured to control said suspension to adjust the height of said suspension when the energy storage device is charging.

4. A motor vehicle as described in paragraph 3, wherein the control unit is configured to adjust the height of said suspension to optimise the charging efficiency of said induction coil.

5. A motor vehicle as described in paragraph 3, wherein the charging monitor is configured to estimate a state of charge of the energy storage device and the control unit is configured to vary said suspension height in direct dependence on said estimated state of charge.

6. A motor vehicle as described in paragraph 3, wherein the control unit is configured to determine a height of said suspension prior to charging the energy storage device and to raise said suspension to said determined height when charging of the energy storage device is complete.

7. A motor vehicle as described in paragraph 1 comprising a compressor and a fluid reservoir in communication with said suspension, wherein the control unit is configured to operate the compressor to fill the fluid reservoir during charging of the energy storage device.

8. A motor vehicle as described in paragraph 7, wherein the control unit is configured to terminate charging of the energy storage device after the fluid reservoir has been filled.

9. A motor vehicle as described in paragraph 1 comprising at least one light source, wherein the control unit is configured to control said at least one light source in dependence on said charging monitor.

10. A motor vehicle as described in paragraph 9, wherein the control unit is configured, in dependence on the charging monitor, to activate/deactivate said at least one light source; and/or control the intensity of said at least one light source; and/or control the colour of the light emitted by said at least one light source.

11. A motor vehicle as described in paragraph 1 comprising a vehicle accessory, wherein the control unit is configured to control a position of said vehicle accessory with respect to said vehicle in dependence on said charging monitor.

12. A motor vehicle as described in paragraph 1 wherein the vehicle accessory comprises at least one of an external mirror and a windscreen wiper, and control unit is configured to control an orientation of said vehicle accessory with respect to the vehicle in dependence on said charging monitor.

13. A vehicle charging system for a motor vehicle having at least one electric traction motor and an energy storage device; the vehicle charging system comprising:
  a charging monitor for monitoring charging of the energy storage device; and
  a control unit for controlling an adjustable-height suspension in dependence on the monitoring means.

14. A method of indicating the charging status of a vehicle energy storage device, the method comprising:
  monitoring a charging status of the vehicle energy storage device;
  adjusting a height of a suspension system to vary the vehicle height in dependence on the charging monitor;
  lowering the height of the suspension system during charging of the vehicle energy storage device; and
  increasing the height of the suspension system when charging of the vehicle energy storage device is complete.

The invention claimed is:

1. A motor vehicle comprising:
  an electric drive system including at least one electric traction motor and an energy storage device;
  an adjustable-height suspension;
  a charging monitor configured to monitor charging of the energy storage device from an external electrical supply;
  a control unit configured to control a height of said suspension to vary a vehicle height of the motor vehicle in dependence on the charging monitor;
  a fluid reservoir in communication with said suspension; and
  a compressor operable to fill the fluid reservoir;
  wherein the control unit is configured to:
    lower said suspension to lower the vehicle height during charging of the energy storage device; and
    raise said suspension to raise the vehicle height when charging of the energy storage device is complete, wherein raising said suspension to raise the vehicle height when charging of the energy storage device is complete comprises operating the compressor to fill the fluid reservoir to raise said suspension during charging of the energy storage device, and terminating charging of the energy storage device after the fluid reservoir has been filled by an amount that has returned the vehicle height to a pre-set level.

2. The motor vehicle of claim 1, wherein the control unit is configured to control said suspension to adjust the height of said suspension when the charging monitor determines that the energy storage device is charging.

3. The motor vehicle of claim 2, wherein the charging monitor is configured to estimate a state of charge of the energy storage device and the control unit is configured to vary the height of said suspension in direct dependence on said estimated state of charge.

4. The motor vehicle of claim 1, wherein the control unit is configured to determine the height of said suspension prior to charging the energy storage device and to raise said suspension to said determined height when charging of the energy storage device is complete.

5. The motor vehicle of claim 1, wherein the motor vehicle comprises an induction coil for coupling to a charging station connected to the external electrical supply.

6. The motor vehicle of claim 5, wherein the control unit is configured to adjust the height of said suspension to optimise charging efficiency of said induction coil.

7. The motor vehicle of claim 1, comprising at least one light source, wherein the control unit is configured to control said at least one light source in dependence on said charging monitor.

8. The motor vehicle of claim 7, wherein the control unit is configured, in dependence on the charging monitor, to activate/deactivate said at least one light source, and/or control intensity of said at least one light source, and/or control colour of light emitted by said at least one light source.

9. The motor vehicle of claim 1, comprising a vehicle accessory, wherein the control unit is configured to control a position of said vehicle accessory with respect to said vehicle in dependence on said charging monitor.

10. The motor vehicle of claim 9, wherein the vehicle accessory comprises at least one of an external mirror and a windscreen wiper, and wherein the control unit is configured to control an orientation of said vehicle accessory with respect to the vehicle in dependence on said charging monitor.

11. The motor vehicle of claim 1, wherein the pre-set level corresponds to the vehicle height before charging was initiated.

12. The motor vehicle of claim 1, wherein the motor vehicle comprises a physical connector to enable wired charging, wherein the charging monitor is configured to monitor charging of the energy storage device from the external electrical supply via a wired connection of the external electrical supply to the physical connector, wherein the control unit is configured to:
perform said lowering said suspension to lower the vehicle height during charging of the energy storage device via the wired connection; and
perform said raising said suspension to raise the vehicle height when charging of the energy storage device via the wired connection is complete.

13. A method of indicating a charging status of a vehicle energy storage device of a motor vehicle, the method comprising:
monitoring the charging status of the vehicle energy storage device; and
adjusting a height of a suspension system to vary a vehicle height of the motor vehicle in dependence on the charging status, comprising lowering the height of the suspension system to lower the vehicle height during charging of the vehicle energy storage device, and increasing the height of the suspension system to raise the vehicle height when charging of the vehicle energy storage device is complete, wherein increasing the height of the suspension system to raise the vehicle height when charging of the energy storage device is complete comprises operating a compressor to fill a fluid reservoir in communication with said suspension system to increase the height of the suspension system during charging of the energy storage device, and terminating charging of the energy storage device after the fluid reservoir has been filled by an amount that has returned the vehicle height to a pre-set level.

14. A control unit for a motor vehicle, the control unit configured to control a height of an adjustable-height suspension of the motor vehicle to vary a vehicle height of the motor vehicle in dependence on a control signal received by the control unit, the control signal being indicative of charging of an energy storage device of the motor vehicle by an external electrical supply,
wherein the control unit is configured to lower said suspension to lower the vehicle height during charging of the energy storage device and to raise said suspension to raise the vehicle height when charging of the energy storage device is complete, wherein raising said suspension to raise the vehicle height when charging of the energy storage device is complete comprises operating a compressor to fill a fluid reservoir in communication with said suspension to raise said suspension during charging of the energy storage device, and terminating charging of the energy storage device after the fluid reservoir has been filled by an amount that has returned the vehicle height to a pre-set level.

15. The control unit of claim 14, wherein the control signal indicates an estimated state of charge of the energy storage device, and wherein the control unit is configured to vary the suspension height in direct dependence on said estimated state of charge.

16. The control unit of claim 14, wherein the control unit is configured to determine the height of said suspension prior to charging the energy storage device and to raise said suspension to said determined height when charging of the energy storage device is complete.

17. The control unit of claim 14, configured to control a position of a vehicle accessory of the motor vehicle with respect to said motor vehicle in dependence on said control signal.

18. The control unit of claim 14, configured to control at least one light source in dependence on said control signal.

19. A motor vehicle comprising:
an electric drive system including at least one electric traction motor and an energy storage device;
an adjustable-height suspension;
a charging monitor configured to charge the energy storage device from an external electrical supply; and
a control unit according to claim 14, wherein the control unit is configured to control the height of the adjustable-height suspension of the motor vehicle to vary a vehicle height of the motor vehicle in dependence on the charging monitor.

* * * * *